(12) United States Patent
King

(10) Patent No.: US 11,679,491 B1
(45) Date of Patent: Jun. 20, 2023

(54) RETRIEVING TOOL AND METHOD

(71) Applicant: John J. King, Appleton, WI (US)

(72) Inventor: John J. King, Appleton, WI (US)

( * ) Notice: Subject to any disclaimer, the term of this patent is extended or adjusted under 35 U.S.C. 154(b) by 0 days.

(21) Appl. No.: 17/868,951

(22) Filed: Jul. 20, 2022

(51) Int. Cl.
*B25J 1/04* (2006.01)

(52) U.S. Cl.
CPC .................................... *B25J 1/04* (2013.01)

(58) Field of Classification Search
CPC .... B25J 1/04; A47F 13/06; E01H 2001/1293; A01K 77/005
USPC ...... 294/1.4, 1.5, 100, 209; 15/257.4, 257.7; 43/12, 105
See application file for complete search history.

(56) References Cited

U.S. PATENT DOCUMENTS

| | | | |
|---|---|---|---|
| 530,156 A * | 12/1894 | Becker et al. | |
| 1,188,185 A * | 6/1916 | Krulish | A01K 69/06 294/77 |
| 1,403,171 A * | 1/1922 | Koenig | A01K 73/12 43/105 |
| 4,050,182 A * | 9/1977 | Basile | A01K 69/06 43/105 |
| 4,141,172 A * | 2/1979 | Prosol | A01K 69/06 43/105 |
| 4,200,319 A * | 4/1980 | Cooper | E01H 1/1206 294/1.4 |
| 4,441,746 A | 4/1984 | Corboy, Jr. | |
| 4,629,234 A | 12/1986 | Sokolowski | |
| 5,403,050 A * | 4/1995 | Searing | A01K 23/005 294/1.5 |
| 5,458,385 A | 10/1995 | Peeples | |
| 5,941,586 A | 8/1999 | Fann | |
| 6,618,978 B1 * | 9/2003 | Miranowski | A01K 97/01 43/4 |
| 9,187,871 B1 * | 11/2015 | Contreras | E01H 1/1206 |
| 9,638,424 B2 | 5/2017 | Towner | |

(Continued)

FOREIGN PATENT DOCUMENTS

| | | |
|---|---|---|
| CN | 104931290 A | 9/2015 |
| CN | 108225819 A | 6/2018 |

(Continued)

OTHER PUBLICATIONS

Accessories Bazaar, "Long Reach Flexible Claw Screw Drain Sink Key Pick Up Tool Grabber Cleaner", retrieved from the internet on or before Jan. 17, 2022 at https://accessoriesbazaar.com, 4 pages filed herewith.

(Continued)

*Primary Examiner* — Dean J Kramer
(74) *Attorney, Agent, or Firm* — Amundsen Davis, LLC

(57) ABSTRACT

Retrieving tool and method. This includes an elongated shaft having a shaft-length and a shaft-handle joined with a top end of the elongated shaft. Also includes a cord having a cord-length, a cord-handle joined with a first end of the cord, and the cord extending along the elongated shaft and movable relative to the elongated shaft where the cord-length is greater than the shaft-length. A platform is foldable upon itself between opposite platform ends, and the opposite platform ends are joined with a second end of the cord adjacent to a bottom end of the elongated shaft such that the platform is movable toward and away from the bottom end of the elongated shaft by the cord.

24 Claims, 8 Drawing Sheets

(56) References Cited

U.S. PATENT DOCUMENTS 10,456,904 B1  10/2019  Stirtz

FOREIGN PATENT DOCUMENTS

| CN | 211553372 U | 9/2020 |
|---|---|---|
| FR | 2862554 A1 | 5/2005 |

OTHER PUBLICATIONS

ODii, "The Best Object Grabbing Tool to Retrieve Your Dropped or Lost Objects from Crunch and Tight Spaces", retrieved from the internet on Jan. 17, 2022 at https://medium.com/@myodii/the-best-object-grabbing-tool-to-retrieve-your-dropped-or-lost-objects-from-crunch-and-tight-spaces-60341ae03d8b, 3 pages filed herewith.

* cited by examiner

RETRIEVING TOOL AND METHOD

TECHNICAL FIELD

This invention generally relates to tools to assist in the retrieval of an object, and more particularly, to a tool and method that can be combined with a handle and a remote folding platform to enable easy and secure retrieval of the object, and preferably for example so when the object is dropped out of reach of the owner and tool, with and without the object, need to travel through a narrow passageway.

BACKGROUND

There are various prior existing tools in the art to try and retrieve remote objects. Often, these tools are of a pincher type with finger and thumb like parts having movement away from the tool, such as reaching out with your arm and grabbing an object with your hand. However, each of these tools has limitations on its effectiveness, and none provide the various combination of benefits my tool can provide, especially when it comes to being able to more easily, with less physical effort, and more versatility, securely retrieve a remote object. Thus, there is a need to address one or more of the deficiencies in the art to better aid in achieving more desirable requirements and avoiding negative ones, for a retrieving tool, especially when used to retrieve an object needing travel of the object and tool through a narrow passageway.

SUMMARY

To address one or more deficiencies in the art and/or better achieve the desirable requirements for retrieving a remote object, there is provided a retrieving tool. The tool includes an elongated shaft having a shaft-length, and a shaft-handle joined with a top end of the elongated shaft. The tool also includes a cord having a cord-length, a cord-handle joined with a first end of the cord, and the cord extending along the elongated shaft and movable relative to the elongated shaft, where the cord-length is greater than the shaft-length. Finally, the tool also includes a platform foldable upon itself between opposite platform ends where the opposite platform ends are joined with a second end of the cord adjacent to a bottom end of the elongated shaft such that the platform is movable toward and away from the bottom end of the elongated shaft by the cord.

In other aspects, there is disclosed a method for making a foldable retrieving tool. The method includes providing an elongated shaft having a shaft-length and a shaft-handle joined with a top end of the elongated shaft. Another step is locating a cord having a cord-length along the shaft-length of the elongated shaft and movable relative to the elongated shaft. Also, there is joining a cord-handle with a first end of the cord. Finally, there is joining a second end of the cord, located adjacent a bottom end of the elongated shaft, to opposite platform ends of a platform foldable upon itself between the opposite platform ends such that the platform is movable by the cord (i) toward the bottom end of the elongated shaft in a closed position and (ii) away from the bottom end of the elongated shaft in the closed position.

Other aspects of the disclosure are directed to configurations and features for the elongated shaft, the cord and the platform.

BRIEF DESCRIPTION OF THE DRAWINGS

The invention may be more completely understood in consideration of the following detailed description of various features of the invention in connection with the accompanying drawings, in which.

Figure 1:
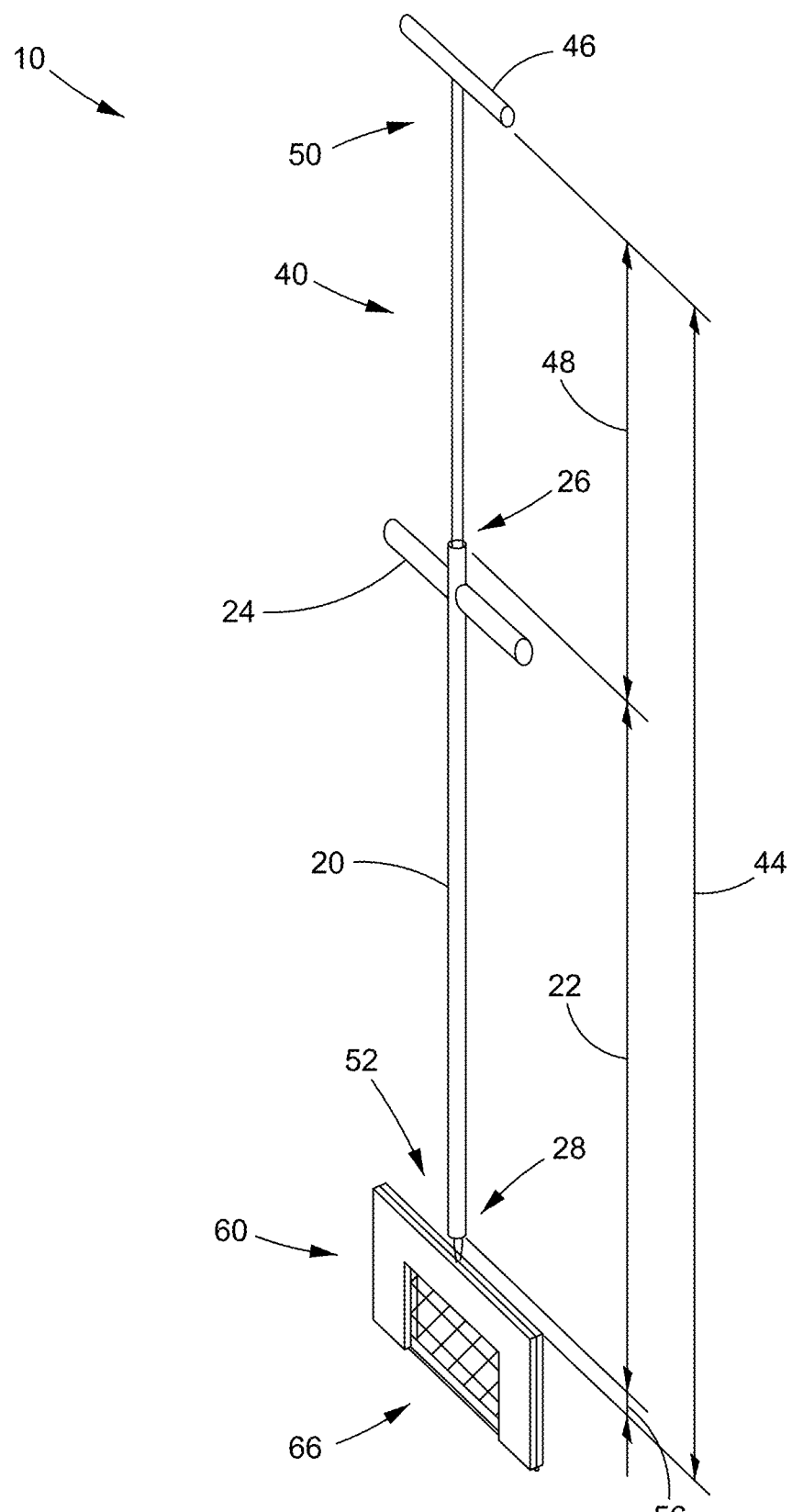
FIG. 1 is a perspective view of my innovative tool in a closed position.
Figure 2:
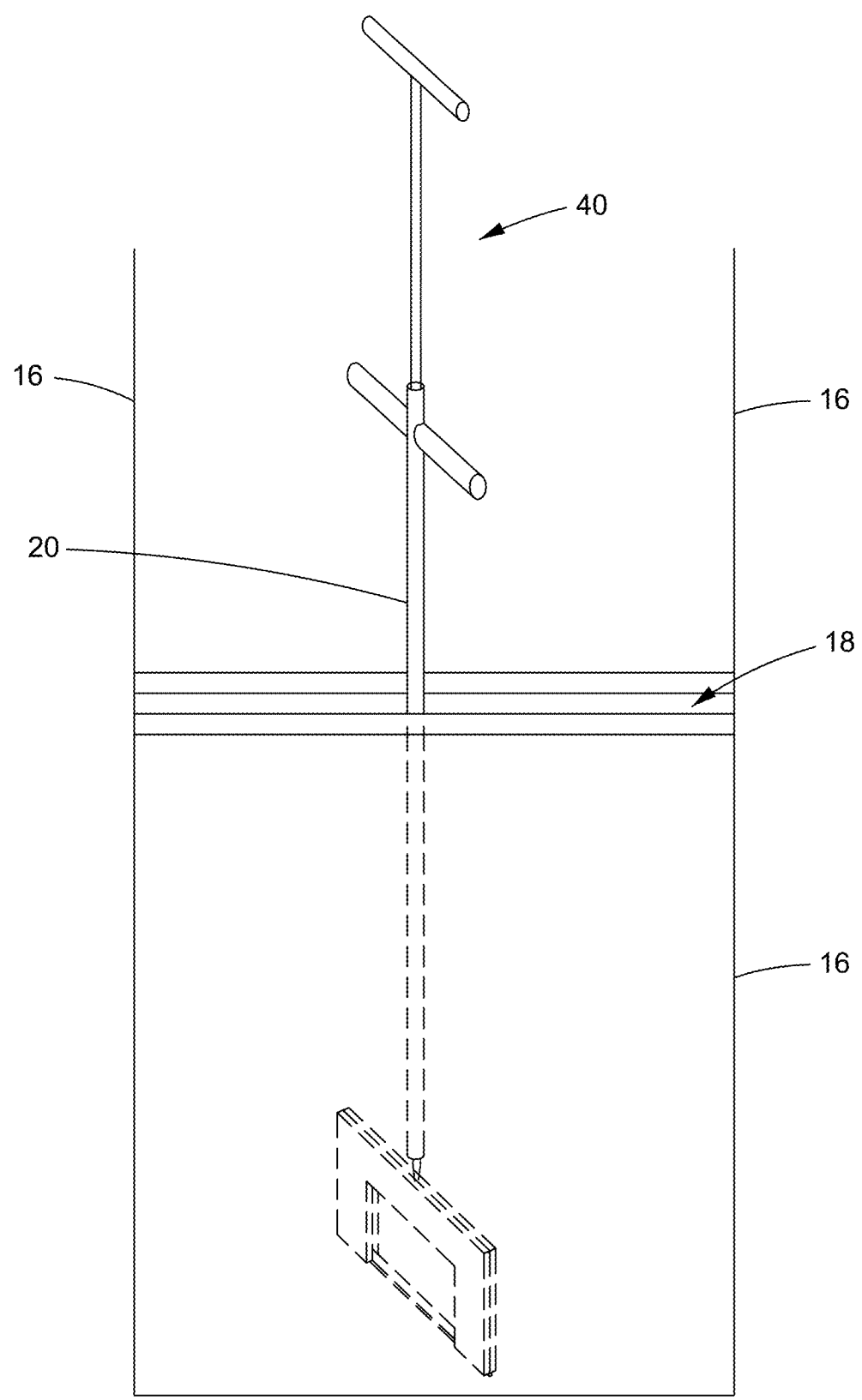
FIG. 2 is a schematic perspective view of the tool in FIG. 1, and now showing use of the tool in a retrieval situation.
Figure 3:
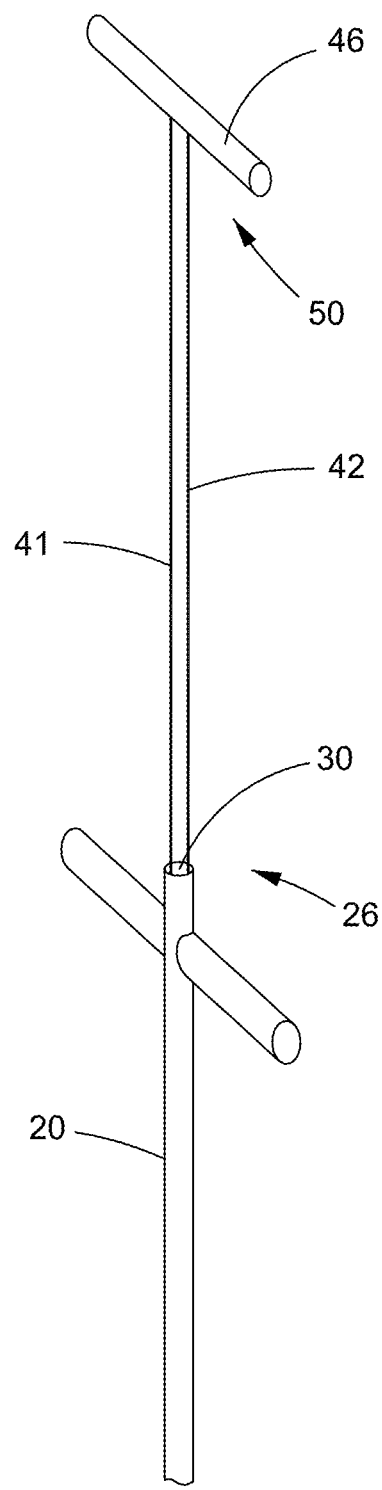
FIG. 3 is an enlarged perspective view of an upper portion of the tool seen in FIG. 1.

The drawings show some but not all embodiments. The elements depicted in the drawings are illustrative and not necessarily to scale, and the same (or similar) reference numbers denote the same (or similar) features throughout the drawings, though all the same (or similar) features are not always separately numbered to help avoid over numbering and obscuring what the drawings are disclosing.

DETAILED DESCRIPTION

In accordance with the practice of my innovative tool, as seen in the Figures, retrieval tool 10 includes an elongated shaft 20 having a shaft-length 22 and a shaft-handle 24 joined with a top end 26 of the elongated shaft. Tool 10 also includes a cord 40 having a cord-length 44, a cord-handle 46 joined with a first end of the cord 50, and the cord extending along the elongated shaft 20. The cord is movable relative to the elongated shaft and the cord-length 44 is greater than the shaft-length 22. While the cord can be located outside the shaft along it, e.g., alongside it, preferably the cord is located in the elongated shaft, e.g., for combined containment and movement therein at inside area 30. Additionally, or alternately, cord 40 can be a single cord along most of its length except for a sufficient distance at second end 52 (as described herein), and preferably the cord is two distinct cord members 41, 42 (e.g., for ease of manufacture). Yet additionally, or alternately, cord 40 can be semi-rigid (e.g., a wire or wire like material or a fiber or cotton-based material with some stiffening agent or structure added) to non-rigid and is preferably substantially non-rigid (e.g., like a conventional cotton rope of ⅛ inch to ½ inch diameter or less, and where the length is substantially greater than its width and no stiffening agent is used therewith).

Further, the tool includes a platform 60 foldable upon itself between opposite platform ends 62, 63. The opposite platform ends 62, 63 are joined with a second end 52 of the cord 40 adjacent to a bottom end 28 of the elongated shaft 20 such that the platform 60 is movable toward and away from the bottom end 28 of the elongated shaft 20 by the cord 40. The platform can be made to be foldable upon itself in a variety of ways, such as the material of the platform being thin and flexible enough to collapse under its own weigh yet resilient enough to want to maintain a flat open position when not subjected to any lifting or closing force. Alternately, the platform can be substantially rigid, made of a piece of wood or similar material thick enough to have sufficient rigidity, and a hinge 68 located between opposite platform ends 62, 63. Preferably, the hinge or foldable area can be located near the center of the platform. Additionally, or alternately, platform 60 can have a basket-like area 70 (e.g., made of a netting or thin very flexible material like a piece of fabric) located inside a frame 72 of the platform 60 and between opposite platform ends 62, 63. For example, and without being limited by a theory of understanding, I have discovered that retrieving tool 10 can better provide leverage to operate the tool when remotely retrieving and then lifting an object, like a set of keys, a handheld phone, or other object someone typically carries or wears. Referring to FIGS. 2, 6 and 9-11, this is especially advantageous when the object is inadvertently dropped down an elevator door opening 18 in an elevator shaft 16. In such a case, a sweeper 14 can be used to move the lost object onto the platform in an open position 64 (FIG. 9) and then the open platform moved into a closed position 66 (FIGS. 2, 10) and lifted out of the elevator shaft 16 (FIG. 11) so the object can be returned to its owner (not shown specifically but well understood to one of ordinary skill in the art based on the disclosure herein).

Further in these regards, preferably, the platform 60 folds to the closed position 66 facing the bottom end 28 of the elongated shaft 20 when the platform is movable toward the bottom end of the elongated shaft by the cord 40. As used herein, "closed" includes any degree where the platform is not substantially flat. That is, "substantially flat" is preferably when the opposite platform ends 62, 63 are their maximum distance apart when the cord is exerting essentially no closing upward force on the platform. So, "closed" is anywhere from not open (i.e., not in as flat an orientation as the platform can go when open) to completely closed as much as the platform sides can come together when the platform is folded upon itself, with and without the lost object therein. Additionally, or alternately, the platform 60 can be folded upon itself when the platform is moved toward the bottom end of the elongated shaft by the cord. In these ways, and as explained further herein, the lost object 12 can be securely held in the platform as all of the platform, the cord and the shaft are retracted from the elevator shaft.

Considering other features of the tool, there is disclosed the cord-handle 46 being movable away from the shaft-handle 24 (e.g., going from FIG. 5 positioning to FIG. 1 positioning, and preferably incrementally as the distance increases between handle 46 and handle 24) to cause the platform to be moved toward the bottom end 28 of the elongated shaft by the cord. In reverse, there is disclosed the cord-handle 46 is movable toward the shaft-handle 24 (e.g., going from FIG. 1 positioning to FIG. 5 positioning, and also, preferably, in a reverse incremental fashion) to cause the platform to be moved away from the bottom end of the elongated shaft by the cord. Further in the regard, for example when the cord is non-rigid, this reverse positioning can be caused a combination of the cord and gravity acting upon the platform to pull the platform away from shaft end 28 as handles 24, 46 approach each other and the tool is in an upright orientation as seen in the Figures with gravity operating to pull upon objects/components from the top to the bottom on the page. And preferably, as handles 46, 24 move closer together, they occupy a fourth predetermined distance 49. Distance 49 can be further preferred, when correlated to first predetermined distance 54, and can be most preferred in a one to one correlation, so shortening distance 49 increases distance 54 inch for inch, and vice versa.

Figure 5:
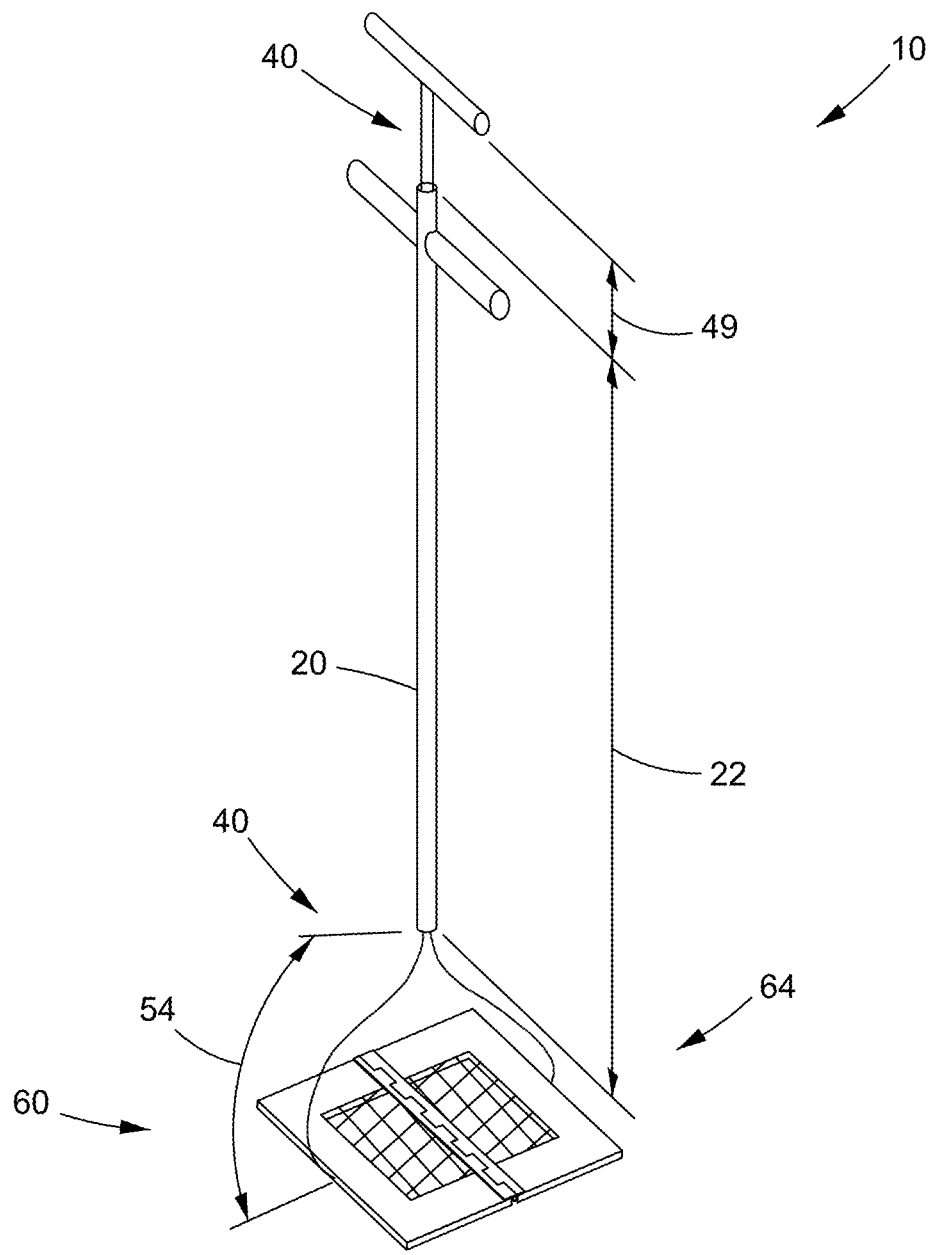
FIG. 5 is a perspective view of the tool seen in FIG. 1, but now in an open position.
Figure 6:
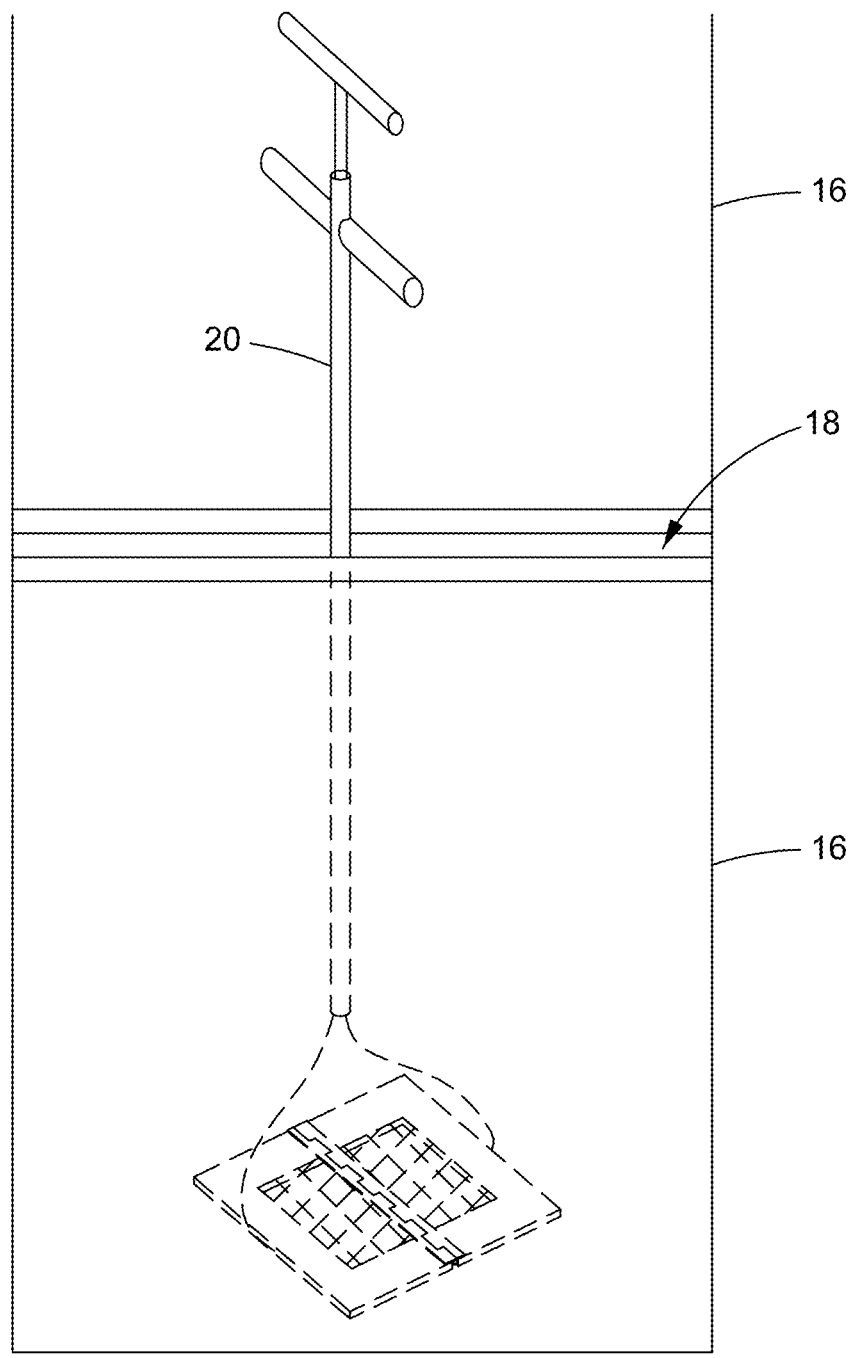
FIG. 6 is a schematic perspective view similar to that seen in FIG. 2, but now with the tool in the open position.
Figure 7:
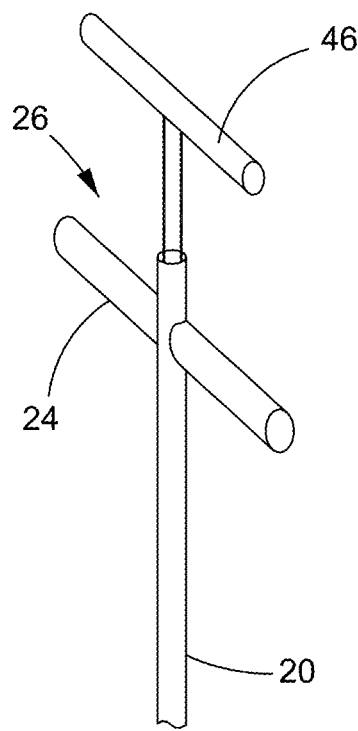
FIG. 7 is an enlarged perspective view of the upper portion of the tool seen in FIG. 5.
Figure 8:
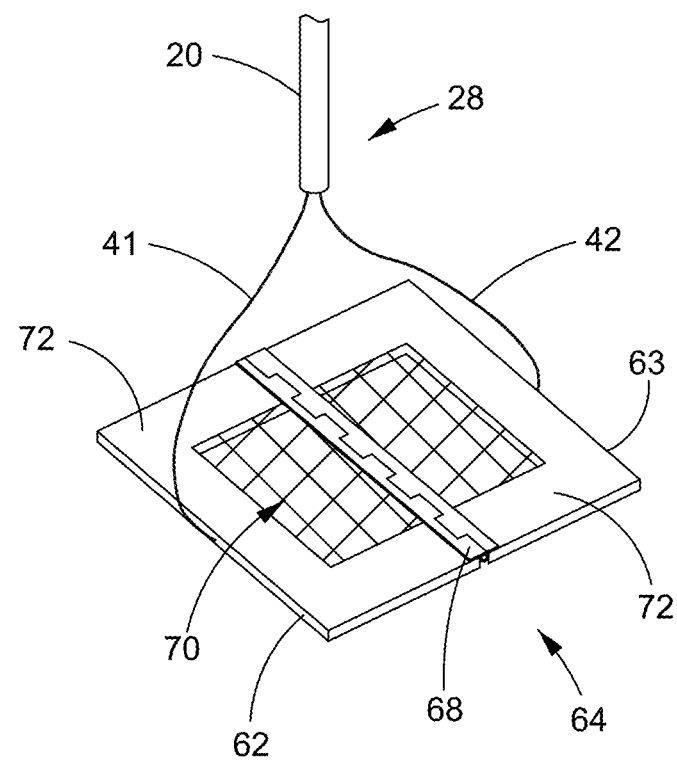
FIG. 8 is an enlarged perspective view of the lower portion of the tool seen in FIG. 5.
Figure 9:
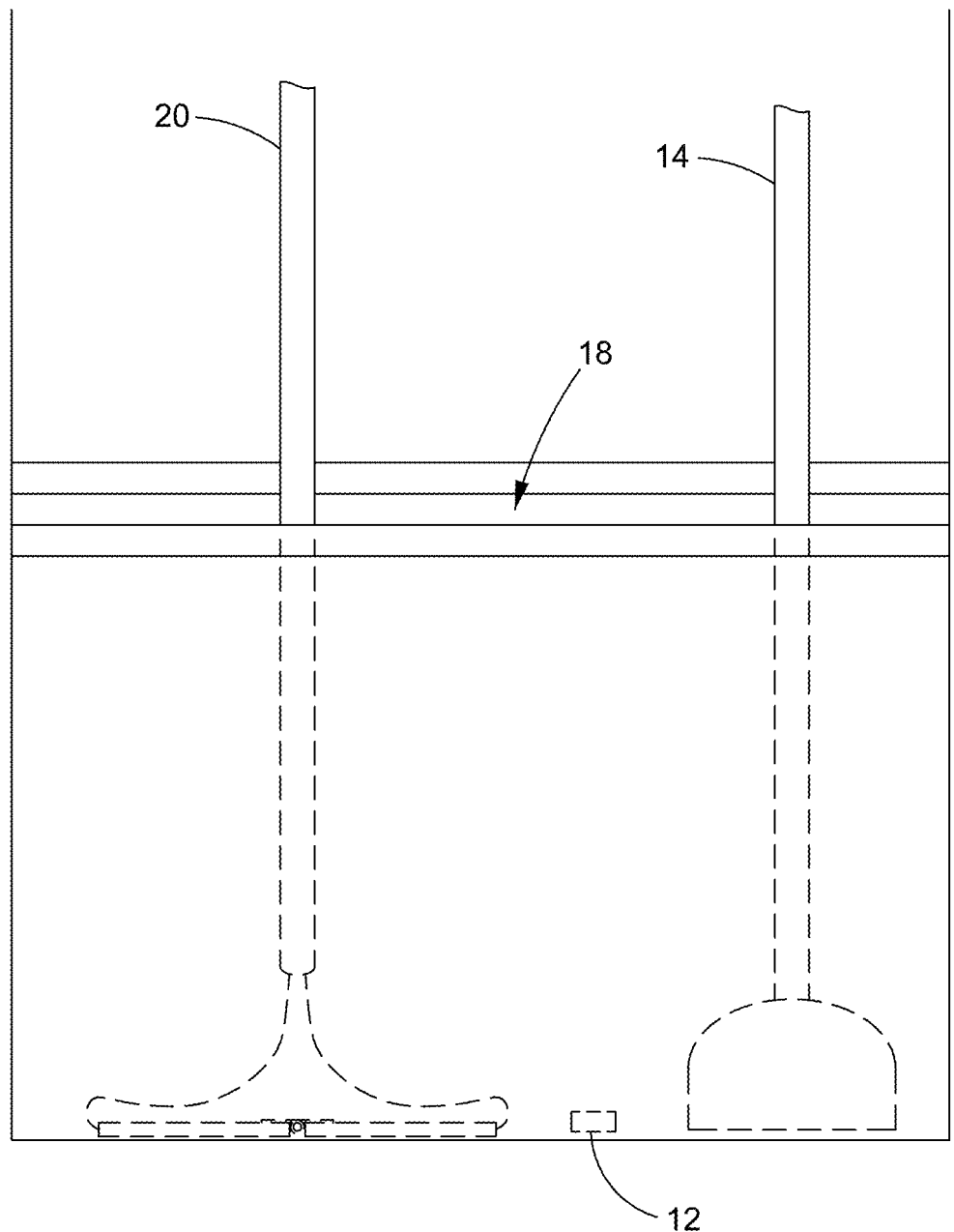
FIG. 9 is a schematic perspective view similar to that seen in FIG. 6, but now with the tool about to help retrieve a lost object that will be moved onto the folding platform by a sweeper; and, FIGS. 10 and 11 are schematic perspective views similar to that seen in FIG. 9, showing successive steps using the tool to retrieve the lost object.

There is also disclosed other, preferred, features related to the relative positioning and movement of cord 40 and the shaft 20. Depending on the cord length as taught herein, the platform can maintain the open position 64 when the second end 52 of the cord is a first predetermined distance 54 away from the bottom end of the shaft. For example, this can be achieved as long as a portion of the cord is long enough to extend out of the bottom end of the shaft and enable platform 60 to be in open position 64. Additionally, preferably, the platform is movable into and maintains the closed position 66 when the second end of the cord is a second predetermined distance 56 away from the bottom end of the shaft, and the second predetermined distance 56 is less than the first predetermined distance 54. For example, the second predetermined distance is anywhere from having second end 52 of cord 40 right next to bottom end 28 of shaft 20 (e.g., FIG. 1), and then extends away from bottom end 28 the distance until just before the platform 60 is in open position 64. As seen in FIG. 5, additional length can be provided to second end 52 so the cord is slack outside the bottom end of shaft 20.

Figure 4:
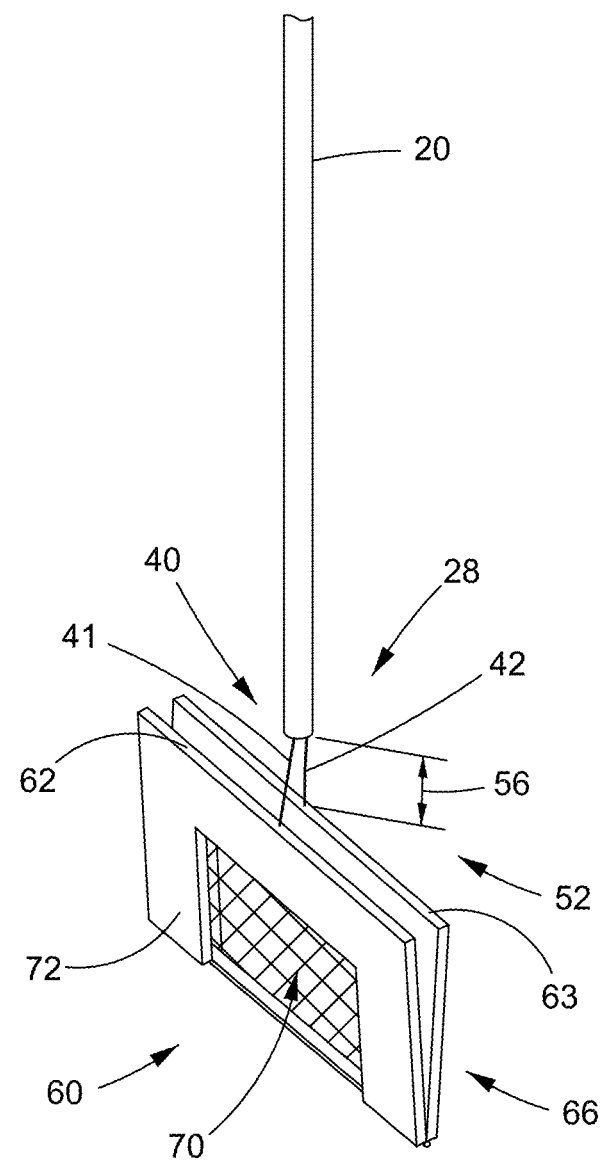
FIG. 4 is an enlarged perspective view of a lower portion of the tool similar to that seen in FIG. 1 but here with a different closed configuration.

Further in regards to the relative positioning just discussed, other features and advantages can be seen. For example, the platform 60 can maintain the closed position 66 when the second end 52 of the cord is the second predetermined distance 56 away from the bottom end of the shaft. And, as discussed herein, to maintain the closed position is anywhere from not open to fully closed, and doing so within this range and not necessarily always at the same closed position, and even can be fluidly moving between not open and fully closed as long as the lost object can be maintained within the basket-like area. Preferably, when the second predetermined distance 56 is its shortest, i.e., second end 52 is as close as it can get to bottom end 28, then the platform is fully closed (and, such can be fully closed somewhat before this point as in FIG. 4) and at its thinnest folded configuration, which is particular advantageous to pass tool 10 and object 12 between a narrow passageway, like an elevator door floor opening 18. Additionally, preferably, the cord-handle 46 can be movable away from the shaft-handle 24 by a third predetermined distance 48 to cause the platform 60 to be located next to the bottom end 28 of the elongated shaft by the cord. Even more preferably, this can be where the third predetermined distance 48 is dependent upon the second predetermined distance 56 and most preferably directly correlated one to one for simultaneous movement of cord 40 along its length between ends 50, 52.

Figure 10:
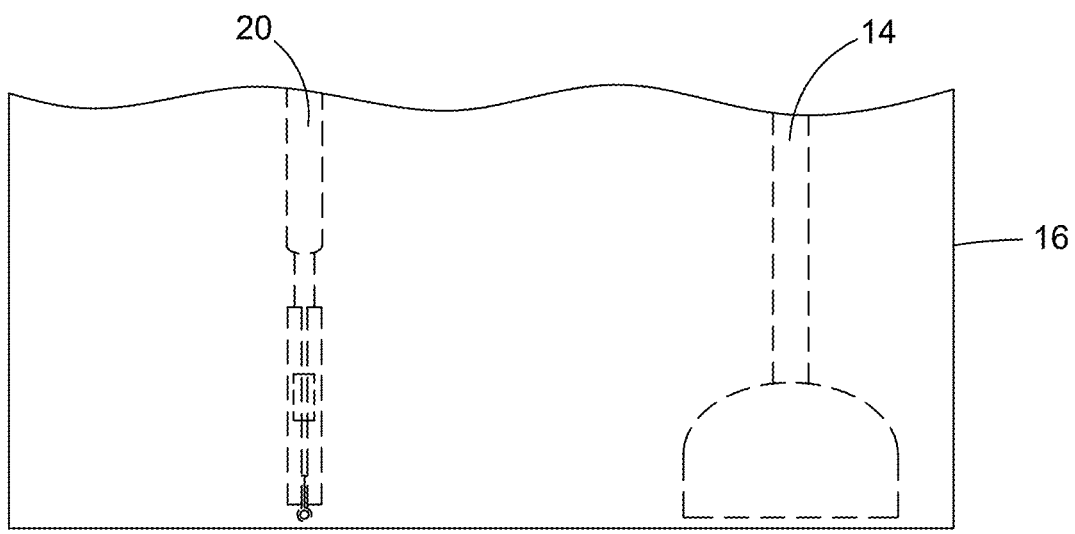
Figure 11:
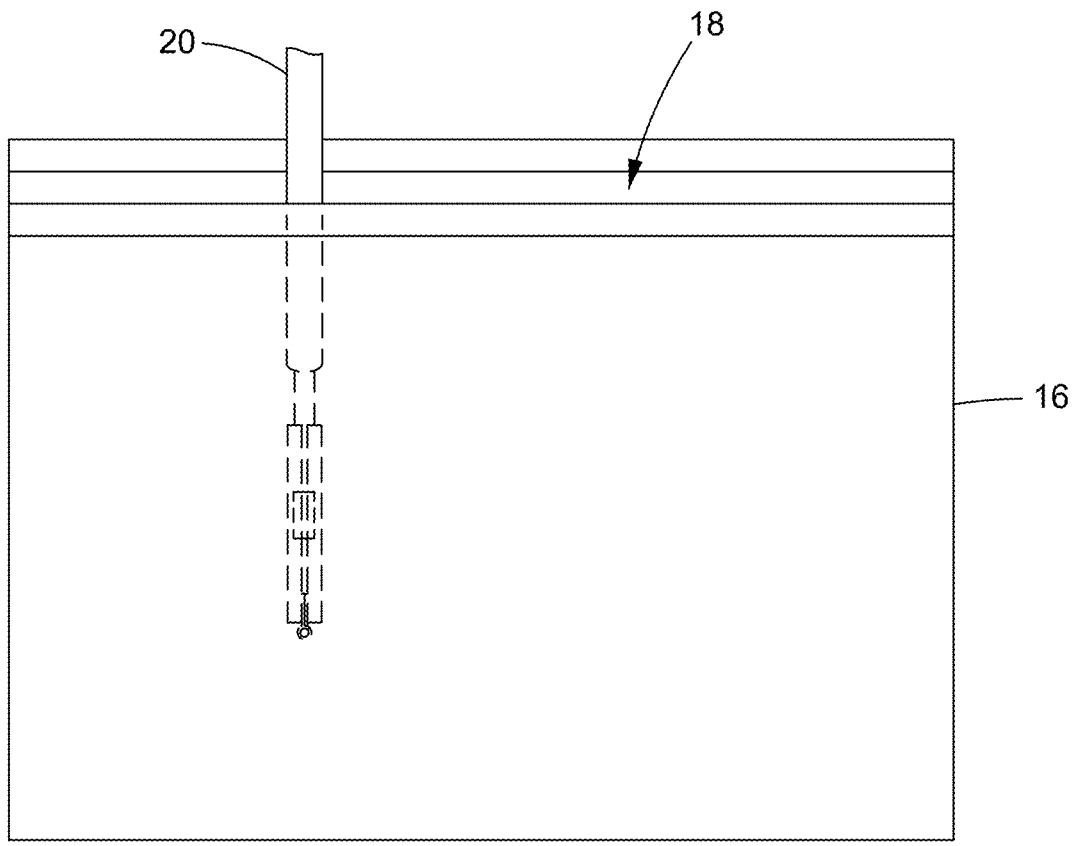

For example, going from FIG. 5 to FIG. 1 orientations, and if cord 40 is a conventional cotton rope material or the like, pulling on cord-handle 46 moves it away from the shaft-handle 24 and pulls the entire cord through shaft 10 by the distance cord-handle 46 moves away from shaft-handle 24, i.e., third predetermined distance 48, and simultaneously the second end 52 of cord 40 is pulled toward bottom end 28 of elongated shaft 20, i.e., from first predetermined distance 54 to second predetermine distance 56. This pulling action at first just moves second end 52 toward bottom end 28, but then once the first predetermined distance is short enough, cord end 52 begins to cause the opposite platform ends 62, 63 to begin to leave open position 64 and begin to move into closed position 66. As platform 60 is moved closer to the fully closed position, continued pulling on first end 50 simultaneously pulls second end 52 because the cord is fully under tension and also moves the closed platform toward bottom end 28 until second predetermined distance 56 is its shortest and second end 52 is right next to bottom end 28 or very close thereto. The entire tool, with object 12 secured inside the folded platform, can then be retracted from its retrieving position and the lost object safely retrieved (FIGS. 10-11).

In another aspect of the disclosure, there is a method for making tool 10. This includes providing elongated shaft 20 having shaft-length 22 and shaft-handle 24 joined with top end 26 of the elongated shaft. Another step is locating cord 40 having cord-length 44 along the shaft-length 22 of the elongated shaft and being movable relative to elongated shaft 20. Also, there is joining cord-handle 46 with first end 50 of cord 40. Finally, though not limited to any order except as is logically required by the disclosed configuration, is joining second end 52 of the cord, located adjacent bottom end 28 of the elongated shaft, to opposite platform ends 62, 63 of platform 60 foldable upon itself between the opposite platform ends such that the platform is movable by the cord (i) toward the bottom end of the elongated shaft in closed position 66 and (ii) away from the bottom end of the elongated shaft in the closed position. Additionally, if desired, the method can include various aspects of the tool as taught, like the cord-length relative to shaft-length, fixedly joining the shaft-handle, the folding orientation of the platform relative to the bottom end of the elongated shaft when the platform is movable toward the bottom end of the elongated shaft by the cord, and others.

In yet other aspects of the method, if desired and as previously taught herein, the method can include correlating the open position 64 to the second end of the cord being the first predetermined distance 54 away from the bottom end of the shaft. Additionally, or alternately, the method can include correlating the closed position 66 to the first end of the cord being third predetermined distance 48 away from the shaft-handle. More preferably in this regard, can also be correlating the closed position 66 to the second end of the cord being second predetermined distance 56 away from the bottom end of the shaft. Still more preferably in this regard, can also be making second predetermined distance 56 dependent upon third predetermined distance 48.

Preferred dimensions of the tool are: platform 60 having dimensions of a length of about 1 foot to 2 feet when fully open, a width of about 1 foot to 2 feet when fully open, and a total thickness when in the closed position 64 of about ½ inch to 1 inch; cord 40 being a conventional cotton cord of about ⅛ inch to ½ inch diameter and a length of about 6 feet to 12 feet on average; and elongated shaft 20 being an at least semi-rigid to rigid plastic tube of a diameter of about ½ inch to 1 inch, and about 6 feet to 12 feet long. Conventional rigid and non-rigid materials can be used to make my tool, in conjunction with the teaching herein, for example, plastic, aluminum, or other material compositions of sufficient strength as would be discerned by one of ordinary skill in the art in combination with the teachings herein, are preferred. And, the tool may be separate parts fixedly joined together or a single molded or formed structure, with the various parts and features movable relative to one another, as described herein.

Additional discussion of embodiments in various scopes now follows:

A. A retrieving tool that includes an elongated shaft having a shaft-length, and a shaft-handle joined with a top end of the elongated shaft. The tool also includes a cord having a cord-length, a cord-handle joined with a first end of the cord, and the cord extending along the elongated shaft and movable relative to the elongated shaft, where the cord-length is greater than the shaft-length. Finally, the tool also includes a platform foldable upon itself between opposite platform ends where the opposite platform ends are joined with a second end of the cord adjacent to a bottom end of the elongated shaft such that the platform is movable toward and away from the bottom end of the elongated shaft by the cord.

B. The tool of any of the prior embodiments, wherein the cord is located inside the elongated shaft.

C. The tool of any of the prior embodiments, wherein the cord-handle is movable away from the shaft-handle to cause the platform to be moved toward the bottom end of the elongated shaft by the cord.

D. The tool of any of the prior embodiments, wherein the cord-handle is movable toward the shaft-handle to cause the platform to be moved away from the bottom end of the elongated shaft by the cord.

E. The tool of any of the prior embodiments, wherein the cord-handle is movable toward the shaft-handle to cause the platform to be moved away from the bottom end of the elongated shaft by a combination of the cord and gravity acting upon the platform.

F. The tool of any of the prior embodiments, wherein the platform is folded upon itself when the platform is moved toward the bottom end of the elongated shaft by the cord.

G. The tool of any of the prior embodiments, wherein the platform maintains an open position when the second end of the cord is a first predetermined distance away from the bottom end of the shaft.

H. The tool of any of the prior embodiments, wherein the platform maintains a closed position when the second end of the cord is a second predetermined distance away from the bottom end of the shaft, and the second predetermined distance is less than the first predetermined distance.

I. The tool of any of the prior embodiments, wherein the platform maintains a closed position when the second end of the cord is a second predetermined distance away from the bottom end of the shaft.

J. The tool of any of the prior embodiments, wherein the cord-handle is movable away from the shaft-handle by a third predetermined distance to cause the platform to be located next to the bottom end of the elongated shaft by the cord.

K. The tool of any of the prior embodiments, wherein the third predetermined distance is dependent upon the second predetermined distance.

L. The tool of any of the prior embodiments, wherein the platform has a hinge located between opposite platform ends.

M. The tool of any of the prior embodiments, wherein the platform has a basket-like area located inside a frame of the platform and between opposite platform ends.

N. The tool of any of the prior embodiments, wherein the cord comprises two distinct cord members.

O. The tool of any of the prior embodiments, wherein the cord is substantially non-rigid.

P. The tool of any of the prior embodiments, wherein the platform folds to a closed position facing the bottom end of the elongated shaft when the platform is movable toward the bottom end of the elongated shaft by the cord.

Q. A method for making a foldable retrieving tool. The method includes providing an elongated shaft having a shaft-length and a shaft-handle joined with a top end of the elongated shaft. Another step is locating a cord having a cord-length along the shaft-length of the elongated shaft and movable relative to the elongated shaft. Also, there is joining a cord-handle with a first end of the cord. Finally, there is joining a second end of the cord, located adjacent a bottom end of the elongated shaft, to opposite platform ends of a platform foldable upon itself between the opposite platform ends such that the platform is movable by the cord (i) toward the bottom end of the elongated shaft in a closed position and (ii) away from the bottom end of the elongated shaft in the closed position.

R. The method of any of the prior method embodiments, wherein the cord-length is greater than the shaft-length.

S. The method of any of the prior method embodiments, further comprising fixedly joining the shaft-handle with the top end of the elongated shaft.

T. The method of any of the prior method embodiments, further comprising correlating the open position to the second end of the cord being a first predetermined distance away from the bottom end of the shaft.

U. The method of any of the prior method embodiments, further comprising correlating the closed position to the first end of the cord being a third predetermined distance away from the shaft-handle.

V. The method of any of the prior method embodiments, further comprising correlating the closed position to the second end of the cord being a second predetermined distance away from the bottom end of the shaft.

W. The method of any of the prior method embodiments, further comprising making the second predetermined distance dependent upon the third predetermined distance.

X. The method of any of the prior method embodiments, further comprising folding the platform to the closed position facing the bottom end of the elongated shaft when the platform is movable toward the bottom end of the elongated shaft by the cord.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

The present invention includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other embodiments will be apparent to a person of ordinary skill in the applicable mechanical tools art, and all such modifications and other embodiments are intended and deemed to be within the scope of the present invention.

What is claimed is:

1. A retrieving tool comprising:
    an elongated shaft having a shaft-length, a shaft-handle joined with a top end of the elongated shaft;
    a cord having a cord-length, a cord-handle joined with a first end of the cord, the cord extending along the elongated shaft and movable relative to the elongated shaft wherein the cord-length is greater than the shaft-length and the cord comprises two distinct cord members;
    a platform foldable upon itself between opposite platform ends where the opposite platform ends are joined with a second end of the cord adjacent to a bottom end of the elongated shaft such that the platform is movable toward and away from the bottom end of the elongated shaft by the cord, wherein the platform folds to a closed position facing the bottom end of the elongated shaft when the platform is movable toward the bottom end of the elongated shaft by the cord; and,
    the cord-handle is movable toward the shaft-handle to cause the platform to be moved away from the bottom end of the elongated shaft by a combination of the cord and gravity acting upon the platform.

2. The tool of claim 1, wherein the cord is located inside the elongated shaft.

3. The tool of claim 1, wherein the cord-handle is movable away from the shaft-handle to cause the platform to be moved toward the bottom end of the elongated shaft by the cord.

4. The tool of claim 1, wherein the platform is folded upon itself when the platform is moved toward the bottom end of the elongated shaft by the cord.

5. The tool of claim 1, wherein the platform maintains an open position when the second end of the cord is a first predetermined distance away from the bottom end of the shaft.

6. The tool of claim 5, wherein the platform maintains a closed position when the second end of the cord is a second predetermined distance away from the bottom end of the shaft, and the second predetermined distance is less than the first predetermined distance.

7. The tool of claim 1, wherein the platform maintains a closed position when the second end of the cord is a second predetermined distance away from the bottom end of the shaft.

8. The tool of claim 7, wherein the cord-handle is movable away from the shaft-handle by a third predetermined distance to cause the platform to be located next to the bottom end of the elongated shaft by the cord.

9. The tool of claim 8, wherein the third predetermined distance is dependent upon the second predetermined distance.

10. The tool of claim 1, wherein the platform has a hinge located between opposite platform ends.

11. The tool of claim 1, wherein the cord is substantially non-rigid.

12. A method for making a retrieving tool comprising:
    providing an elongated shaft having a shaft-length and a shaft-handle joined with a top end of the elongated shaft;
    locating a cord having a cord-length along the shaft-length of the elongated shaft and movable relative to the elongated shaft;
    joining a cord-handle with a first end of the cord;

joining a second end of the cord, located adjacent a bottom end of the elongated shaft, to opposite platform ends of a platform foldable upon itself between the opposite platform ends such that the platform has a basket-like area located inside a frame of the platform and between opposite platform ends and is movable by the cord (i) toward the bottom end of the elongated shaft in a closed position by folding the platform to the closed position facing the bottom end of the elongated shaft when the platform is movable toward the bottom end of the elongated shaft by the cord and (ii) away from the bottom end of the elongated shaft in the closed position;

moving the cord-handle toward the shaft-handle to cause the platform to be moved away from the bottom end of the elongated shaft by a combination of the cord and gravity acting upon the platform.

13. The method of claim 12, wherein the cord-length is greater than the shaft-length.

14. The method of claim 12, further comprising fixedly joining the shaft-handle with the top end of the elongated shaft.

15. The method of claim 12, further comprising correlating an open position to the second end of the cord being a first predetermined distance away from the bottom end of the shaft.

16. The method of claim 12, further comprising correlating the closed position to the first end of the cord being a third predetermined distance away from the shaft-handle.

17. The method of claim 16, further comprising correlating the closed position to the second end of the cord being a second predetermined distance away from the bottom end of the shaft.

18. The method of claim 17, further comprising making the second predetermined distance dependent upon the third predetermined distance.

19. A retrieving tool comprising:
an elongated shaft having a shaft-length, a shaft-handle joined with a top end of the elongated shaft;
a cord having a cord-length, a cord-handle joined with a first end of the cord, the cord extending along the elongated shaft and movable relative to the elongated shaft wherein the cord-length is greater than the shaft-length, and the cord comprises two distinct cord members; and,
a platform foldable upon itself between opposite platform ends where the opposite platform ends are joined with a second end of the cord adjacent to a bottom end of the elongated shaft such that the platform is movable toward and away from the bottom end of the elongated shaft by the cord.

20. The tool of claim 19, wherein the cord-handle is movable away from the shaft-handle to cause the platform to be moved toward the bottom end of the elongated shaft by the cord.

21. The tool of claim 19, wherein the platform is folded upon itself when the platform is moved toward the bottom end of the elongated shaft by the cord.

22. The tool of claim 19, wherein the platform has a basket-like area located inside a frame of the platform and between opposite platform ends.

23. The tool of claim 19, wherein the platform maintains an open position when the second end of the cord is a first predetermined distance away from the bottom end of the shaft.

24. The tool of claim 23, wherein the platform maintains a closed position when the second end of the cord is a second predetermined distance away from the bottom end of the shaft, and the second predetermined distance is less than the first predetermined distance.

* * * * *